US012576889B2

(12) United States Patent
Dinparastdjadid et al.

(10) Patent No.: US 12,576,889 B2
(45) Date of Patent: **\*Mar. 17, 2026**

(54) METHOD, SYSTEM, AND MEDIA FOR CALCULATING A SURPRISE SCORE BY COMPARING A POSTERIOR STATE TO A PRIOR PROBABILITY DISTRIBUTION

(71) Applicant: Waymo LLC, Mountain View, CA (US)

(72) Inventors: Azadeh Dinparastdjadid, Sunnyvale, CA (US); Johan Engstrom, Los Gatos, CA (US); Haoyu Chen, Santa Clara, CA (US); Isaac Supeene, Sunnyvale, CA (US); Menghui Wang, Santa Clara, CA (US)

(73) Assignee: Waymo LLC, Mountain View, CA (US)

( \* ) Notice: Subject to any disclaimer, the term of this patent is extended or adjusted under 35 U.S.C. 154(b) by 19 days.

This patent is subject to a terminal disclaimer.

(21) Appl. No.: 18/672,812

(22) Filed: May 23, 2024

(65) Prior Publication Data

US 2024/0308551 A1 Sep. 19, 2024

Related U.S. Application Data

(63) Continuation of application No. 17/399,418, filed on Aug. 11, 2021, now Pat. No. 12,017,686.

(51) Int. Cl.
B60W 60/00 (2020.01)
G07C 5/08 (2006.01)

(52) U.S. Cl.
CPC ....... B60W 60/0027 (2020.02); G07C 5/0808 (2013.01); B60W 2554/4026 (2020.02);
(Continued)

(58) Field of Classification Search
None
See application file for complete search history.

(56) References Cited

U.S. PATENT DOCUMENTS 9,104,965 B2 8/2015 Fritsch
9,511,767 B1 12/2016 Okumura et al.
(Continued)

FOREIGN PATENT DOCUMENTS

WO WO 2017/016558 2/2017
WO WO 2017/079219 5/2017

OTHER PUBLICATIONS

"Baumann, Matthias;, Method for Predicting the Duration OfA Possible Coasting Phase of a Vehicle Having a Coasting Function" (Year: 201).

(Continued)

*Primary Examiner* — James J Lee
*Assistant Examiner* — Jonathan E Reinert
(74) *Attorney, Agent, or Firm* — Fish & Richardson P.C.

(57) ABSTRACT

Methods, systems, and apparatus, including computer programs encoded on computer storage media, for computing a backward looking surprise metric for autonomously driven vehicles. One of the methods includes obtaining first data representing one or more previously predicted states of an agent along one or more predicted trajectories of the agent at a first time step. Second data representing one or more states of the agent at a subsequent time step is obtained. A surprise score is computed from a measure of a difference between the first data computed for the one or more predicted trajectories for the prior time step and the second data computed for the one or more predicted states for the subsequent time step.

20 Claims, 5 Drawing Sheets

(52) U.S. Cl.

CPC .............. *B60W 2554/4029* (2020.02); *B60W 2554/404* (2020.02)

(56) References Cited

U.S. PATENT DOCUMENTS

| | | | |
|---|---|---|---|
| 10,037,036 | B2 | 7/2018 | Nilsson et al. |
| 12,017,686 | B1 * | 6/2024 | Dinparastdjadid .. G07C 5/0808 |
| 2006/0106743 | A1 | 5/2006 | Horvitz |
| 2015/0199614 | A1 * | 7/2015 | Pinel .................... G06Q 10/067 |
| | | | 706/52 |
| 2017/0154529 | A1 | 6/2017 | Zhao et al. |
| 2019/0146492 | A1 * | 5/2019 | Phillips ................ G05B 13/041 |
| | | | 701/23 |
| 2019/0193741 | A1 | 6/2019 | Hitomi |
| 2019/0250617 | A1 * | 8/2019 | Ford .................... G05D 1/0212 |
| 2020/0096985 | A1 | 3/2020 | Wenzel |
| 2020/0110416 | A1 | 4/2020 | Hong |
| 2020/0160535 | A1 | 5/2020 | Aliakbarian |
| 2021/0182604 | A1 | 6/2021 | Anthony |
| 2021/0200221 | A1 | 7/2021 | Omari et al. |
| 2021/0229656 | A1 | 7/2021 | Dax |
| 2021/0255622 | A1 * | 8/2021 | Haynes ............. B60W 60/0027 |

OTHER PUBLICATIONS

Baldi et al., "Bayesian surprise attracts human attention," Advances in neural information processing systems, 2005, 18:8 pages.

Cepelewicz et al., "To Make Sense of the Present, Brains, May Predict the Future," Quanta Magazine, Jul. 10, 2018, 8 pages.

Engström et al., "Great expectations: a predictive processing account of automobile driving," Theoretical Issues in Ergonomics Science, Apr. 2017, 19(2):156-194.

Engström et al., "Scenario Criticality Determines the Effect of Working Memory Load on Brake Response Time," Volvo Technology Corporation/SAFER, Chalmers University, 2010, pp. 25-36.

Engström et al., "Simulating the Effect of Cognitive Load on Braking Responses in Lead Vehicle Braking Scenarios," The Institution of Engineering and Technology, 2018, pp. 1-7.

Foster et al., "Why some surprises are more surprising than others: Surprise as a metacognitive sense of explanatory difficulty," Cognitive Psychology, Sep. 2015, 81:74-116.

Friston et al., "Active Inference: A Process Theory, Neural Computation," Neural Computation, 2017, 29:1-49.

Friston, "Active Inference and Cognitive Consistency," Psychological Inquiry, 2018, 29(2):67-73.

Friston, "The free-energy principle: a unified brain theory?" Nature Reviews Neuroscience, Jan. 2010, 11(2):127-138.

Ledermann et al., "Information Theory and Statistics," Population, 1962, 17(2):377-378 (English abstract).

Markkula et al., "A farewell to brake reaction times? Kinematics-dependent brake response in naturalistic rear-end emergencies," Accident Analysis and Prevention, 2016, 95:209-226.

Markkula, "Modeling Driver Control Behavior in Both Routine and Near-accident Driving," Proceedings of the Human Factors and Ergonomics Society Annual Meeting, Oct. 2014, 58:879-883.

Medium.com [online], "Cruise's Continuous Learning Machine Predicts the Unpredictable on San Francisco Roads," Sep. 10, 2020, retrieved on Dec. 9, 2021, retrieved from URL<https://medium.com/cruise/cruise-continuous-learning-machine-30d60f4c691b/>, 12 pages.

Medium.com [online], "Rethinking Cruise's AV Development Loop During COVID-19," Mar. 26, 2020, retrieved on Dec. 9, 2021, retrieved from URL<https://medium.com/cruise/cruise-av-development-loop-covid-19-1daef2f0c3d5/>, 6 pages.

Oatley et al., "Towards a cognitive theory of emotions," Cognition and Emotion, Jun. 1986, 1(1):29-50.

Pitt, "Machines That Learn Through Action," Slide Presentation, Yow Conference, 2017, 62 pages.

Pyszczynski et al., "Toward an integration of cognitive and motivational perspectives on social inference: A biased hypothesis-testing model," Advances in Experimental Social Psychology, 1987, 20:297-340.

Raviv et al., "The Genius Neuroscientist Who Might Hold The Key to True AI," Wired Magazine, Nov. 13, 2018, 42 pages.

Reisenzein et al., "The cognitive-evolutionary model of surprise: A review of the evidence," Topics in cognitive science, Sep. 2017, 11(1):50-74.

Reisenzein, "Surprise," Encyclopedia of human behavior, 2nd edition, 2012, pp. 564-570.

Stiensmeier-Pelster et al., "The role of surprise in the attribution process," Cognition & Emotion, 1995, 9(1):5-31.

Svärd et al., "A quantitative driver model of pre-crash brake onset and control," Proceedings of the Human Factors and Ergonomics Society, Annual Meeting, 2017, pp. 339-343.

\* cited by examiner

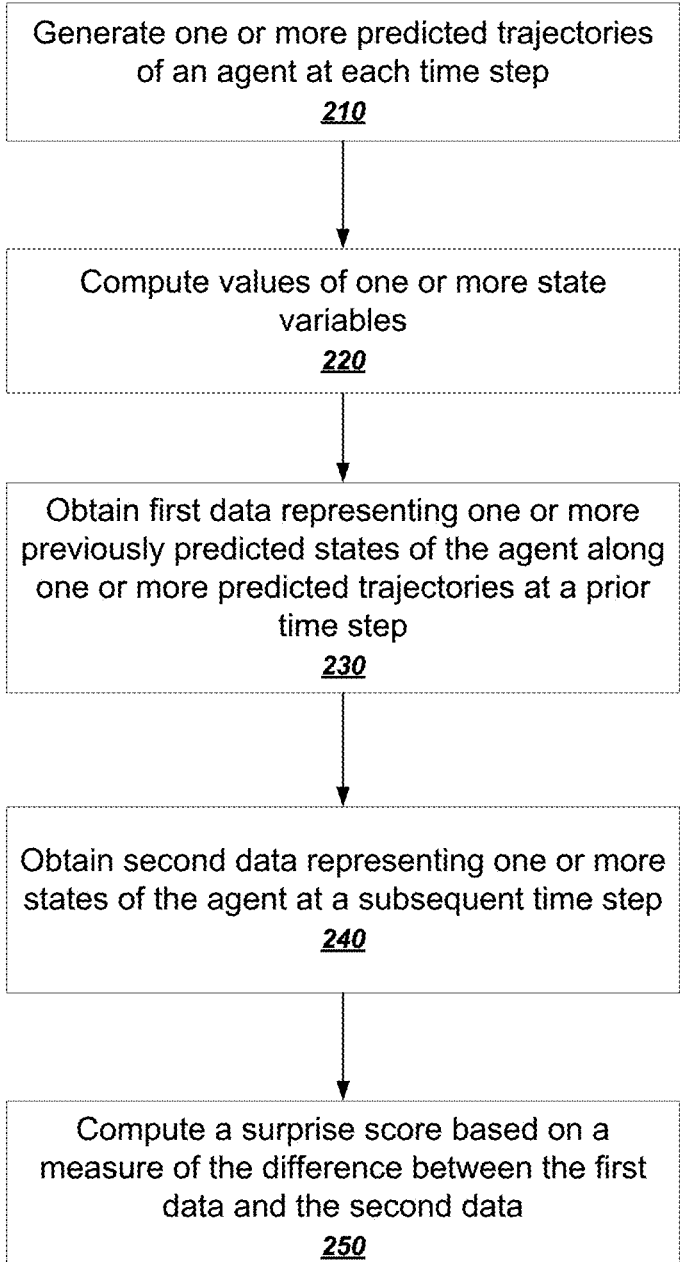

Generate one or more predicted trajectories
of an agent at each time step
*210*

Compute values of one or more state
variables
*220*

Obtain first data representing one or more
previously predicted states of the agent along
one or more predicted trajectories at a prior
time step
*230*

Obtain second data representing one or more
states of the agent at a subsequent time step
*240*

Compute a surprise score based on a
measure of the difference between the first
data and the second data
*250*

FIG. 2

Current Time Step (t₃)

Initial Time Step (t₀)

METHOD, SYSTEM, AND MEDIA FOR CALCULATING A SURPRISE SCORE BY COMPARING A POSTERIOR STATE TO A PRIOR PROBABILITY DISTRIBUTION

CROSS-REFERENCE TO RELATED APPLICATION

This is a continuation of U.S. application Ser. No. 17/399, 418, filed on Aug. 11, 2021, the disclosure of which is considered part of and is incorporated by reference in the disclosure of this application.

BACKGROUND

This specification relates to autonomous vehicles and enhanced techniques for performing surprise assessments for the actions of various agents.

Autonomous vehicles include self-driving cars (including buses, trucks, etc.), boats, and aircraft. Autonomous vehicles use a variety of on-board sensors and computer systems to detect nearby objects and use such detections to make control and navigation decisions.

Fully autonomous driving by an autonomous vehicle (ATV) or a self-driving car (SDC) has been a difficult and complex technical problem to solve. Part of the complexity stems from the fact that simply knowing current traffic laws, reliably detecting other vehicles and pedestrians, and being able to control the vehicle to high degrees of precision are still often not enough to achieve fully autonomous driving. This is because the actions of other drivers also need to be known or predicted, which can be a much harder problem than the mere detection of static obstacles. For example, if a cyclist is detected approaching an intersection, whether or not an ATV should stop at the intersection, or keep going, largely depends on what the cyclist is expected to do and what the cyclist is expecting the ATV to do, which is information that is not possible to observe directly.

SUMMARY

This specification describes how a system can compute a measure of backward-looking surprise for driving behaviors of agents in a driving environment. In this specification, an agent can be any appropriate entity in a driving environment capable of moving independently. Thus, an agent can be an autonomous or semi-autonomous vehicle (ATV). An agent can also be other cars, cyclists, pedestrians, and animals, to name just a few examples. The backward-looking surprise metric described in this specification is robust enough to be used in both offline and online scenarios. In other words, the techniques described below can be used for online operations, e.g., planning and driving decisions; and for offline analysis of simulated or previously recorded agent behaviors; or both.

The system can compute a number of different surprise metrics using an approach that compares vehicle data for a first time step to trajectories predicted at a previous time step. For example, the system can compute the surprise metric for a current state to represent how surprising an agent's driving behavior is at a particular time step, or for a future predicted state to represent how surprising a potential course of action will be.

The techniques described below are also flexible enough to compute either imposed or experienced surprise. In other words, the system can compute a measure of how surprising an ATV's own driving behavior is, as well as a measure of how surprising the behaviors of other observed agents are.

Particular embodiments of the subject matter described in this specification can be implemented so as to realize one or more of the following advantages. The techniques described in this specification allow a surprise assessment to be computed in a backward-looking fashion. This allows surprise assessments to be computed offline using existing or simulated log data, which increases the amount of data that is available to be processed. This in turn results in richer and more realistic predictions. The techniques described below allow for a stable surprise metric to be computed using multiple possible predicted trajectories. This basic framework enhances the capabilities of a surprise assessment system by allowing predictions for experienced or imposed surprise, current or future surprise, as well as a number of different mechanisms of computing the surprise.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a diagram of an example flowchart for computing a surprise score.

Like reference numbers and designations in the various drawings indicate like elements.

DETAILED DESCRIPTION

Figure 1:
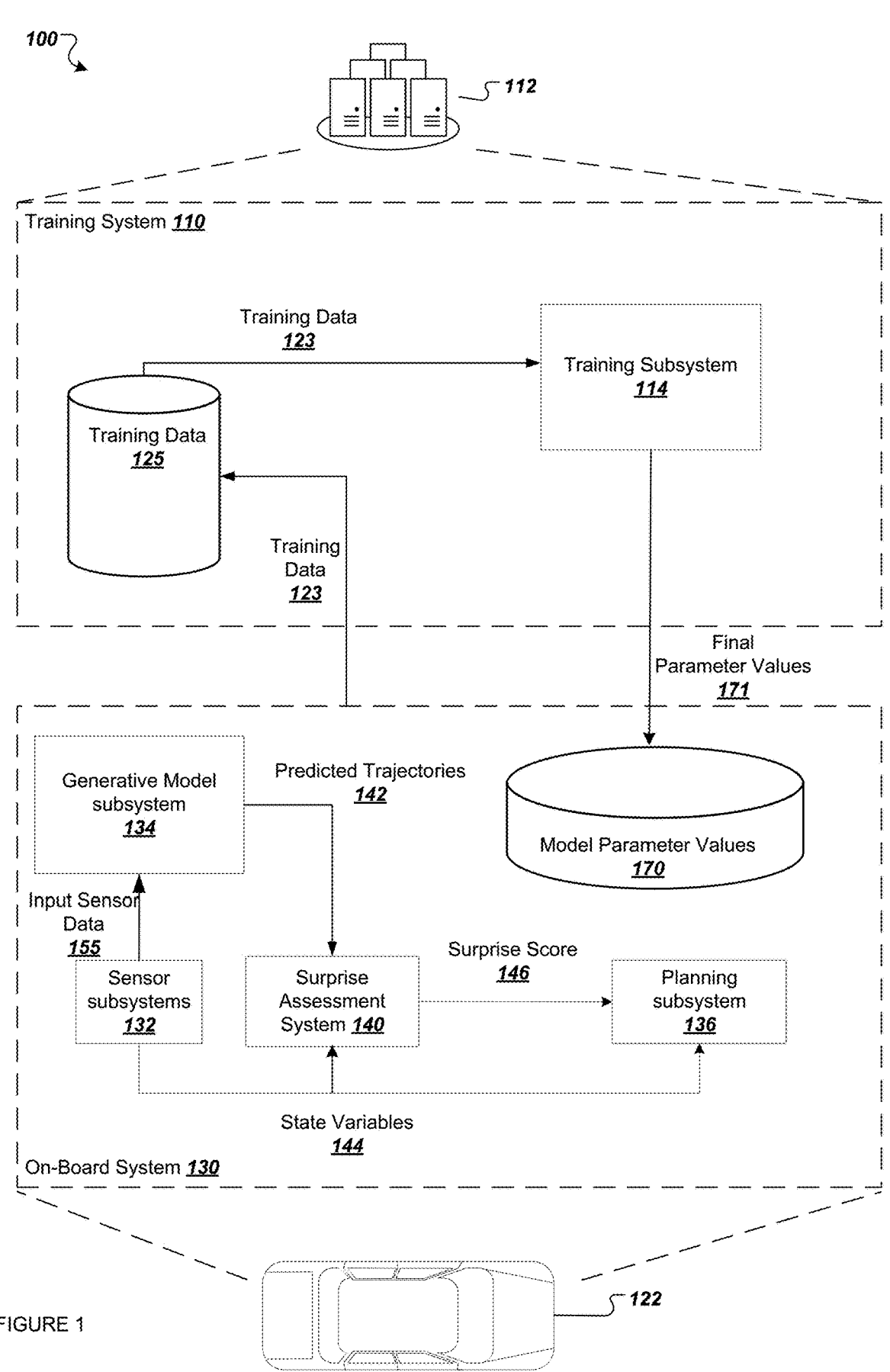
FIG. 1 is a diagram of an example system.

FIG. 1 is a diagram of an example system 100. The system 100 includes a training system 110 and an on-board system 120. The system 100 is an example of a system that can compute a backward-looking surprise assessment of a driving scenario to determine the measure of surprise of a driving event. The surprise assessments can also be evaluated offline. For example, surprise assessments can also be computed offline by the training system 110, e.g., using previously stored driving logs or simulated driving data.

The on-board system 120 is physically located on-board a vehicle 122. Being on-board the vehicle 122 means that the on-board system 120 includes components that travel along with the vehicle 122, e.g., power supplies, computing hardware, and sensors. The vehicle 122 in FIG. 1 is illustrated as an automobile, but the on-board system 120 can be located on-board any appropriate vehicle type. The vehicle 122 can be a fully autonomous vehicle that uses predictions about nearby objects in the surrounding environment to inform fully autonomous driving decisions. The vehicle 122 can also be a semi-autonomous vehicle that uses predictions about nearby objects in the surrounding environment to aid a human driver. For example, the vehicle 122 can rely on the planning subsystem 136 to autonomously apply the brakes if output trajectories from the model predict the vehicle may collide with another object.

The on-board system 120 includes one or more sensor subsystems 132. The sensor subsystems can include a combination of components that receive reflections from the environment, e.g., lidar systems that detect reflections of laser light, radar systems that detect reflections of radio waves, camera systems that detect reflections of visible light, and audio sensor systems that record sounds from the environment, to name just a few examples.

The input sensor data can indicate a distance, a direction, and an intensity of reflected energy. Each sensor can transmit one or more pulses, e.g., of electromagnetic radiation, in a particular direction and can measure the intensity of any reflections as well as the time that the reflection was received. A distance can be computed by determining how long it took between a pulse and its corresponding reflection. Each sensor can continually sweep a particular space in angle, azimuth, or both. Sweeping in azimuth, for example, can allow a sensor to detect multiple objects along a same line of sight.

The sensor subsystems 132 can provide input sensor data 155 to an on-board generative model subsystem 134. The input sensor data 155 can include data from one sensor or multiple sensors at multiple locations surrounding the vehicle 122. The input sensor data 134 thus provides a representation of the surrounding environment of the vehicle, which can include data representing the presence of objects.

The on-board generative model subsystem 134 operates to generate predicted future states and trajectories of agents based on their current states or a history window of previous states. Each predicted trajectory represents multiple future predicted states of an agent at each of multiple future time steps, with each predicted state having one or more state variables. The predicted future states can be represented by values of state variables or probability distributions over such state variables. For example, a state variable can be an agent's position, speed, looming, and heading angle, to name just a few examples.

The on-board generative model subsystem 134 can generate the predicted trajectories in accordance with model parameter values that have been trained by a training system 110 based on training data. The generative model subsystem can thus learn to generate trajectories that are representative of observations in the training data. For example, the generative model subsystem 134 can implement a generative adversarial network (GAN) that is trained to generate realistic trajectories based on what other agents have been observed to do under particular circumstances during previous driving trips. In other words, the generative model is trained to generate trajectories that are hard for a companion discriminator network to distinguish from trajectories in the training data that were actually taken by real-world agents, based on their state variables at the time of prediction.

The surprise assessment subsystem 140 can use the predicted trajectories 142 generated by the generative model subsystem 134 and the values of one or more state variables 144 to compute a surprise score 146. The surprise score 146 is a metric that represents how surprising an observer would find the behavior of an agent to be. As mentioned above, the surprise score 146 can model the surprise experienced from the perspective of the vehicle 122, or the surprise imposed on other agents due to actions of the vehicle. These two types of surprise can be referred to as experienced surprise or imposed surprise.

As shown in the example of FIG. 1, the surprise score 146 can be provided to a planning subsystem 136 that is responsible for operating the control interfaces of the vehicle, e.g., acceleration, braking, and steering systems.

The surprise score 146 can be used by the planning subsystem 136 to affect planning in a number of different ways. For example, the planning subsystem 136 can use the surprise score 146 to control exposure to risk by planning routes that avoid experienced surprise. In other words, if choosing between future trajectories, the planning subsystem 136 can select trajectories having a lower probability of resulting in experienced surprise. In practice, this can mean giving other vehicles more space.

For example, if another vehicle is observed to have surprising lateral movement, e.g., the planning subsystem 136 can mitigate risk by generating a plan that avoids experienced surprise. To do so, the planning subsystem 136 can generate a path that gives extra lateral clearance than normal when overtaking, or the planning subsystem 136 can decide not to overtake at all in order to avoid the possibility of experienced lateral surprise by the other vehicle.

Alternatively or in addition, the planning subsystem 136 can use the surprise score 146 to avoid expectation mismatches that impose surprise on others. In other words, if choosing between future trajectories, the planning subsystem 136 can select trajectories having a lower probability of imposing surprise on other agents.

As another example, the surprise score 146 can represent how surprising the actions of the ATV itself are, and the planning subsystem 136 can take steps to mitigate that surprise. For example, if the ATV swerves to avoid an unexpected animal or other debris in the road, this action would result in a high surprise score 146. The planning subsystem 136 can then modify a navigation plan to mitigate the surprise of those actions, e.g., by returning to the original navigation path as quickly as possible.

The above examples are examples of how a backward-looking surprise metric can be used for online driving applications. Alternatively or in addition, the backward-looking surprise metric can be computed offline, e.g., in a datacenter, for a variety of applications. The training system 110 can be implemented in a datacenter 112. The training system 110 includes a training subsystem 114 that can implement training operations for various machine learning models, including generative models designed to generate realistic predicted trajectories. The training subsystem 114 includes a plurality of computing devices having software or hardware modules that implement the respective training operations. After training is complete, the training system 110 can optionally provide a final set of model parameter values 171 to the on-board system 120. The training system 110 can provide the final set of model parameter values 171 by a wired or wireless connection to the on-board system 120.

For example, the training subsystem 114 can have its own generative model subsystem and surprise assessment system and can use these subsystems in tandem to compute surprise scores from logged or simulated data. The advantage of using logged or simulated data is increased capacity to compute surprise scores from a greater variety of situations.

The resulting surprise scores can then be used to train other machine learning models. In general, any online application of using a surprise score can be used as a feature to another planning model. In other words, rather than using the surprise scores directly, a planning subsystem can be trained to reduce experienced or imposed surprise as reflected in the logs. In other words, the training system 110 can use the surprise scores to train a planning model that avoids surprising situations. Thus, the training system 110 can train the planning system by imposing a penalty for generating candidate driving plans that would result in high surprise scores, in terms of experienced surprise, imposed surprise, or both.

The surprise scores can also be used to evaluate the performance of an ATV using either simulated or logged data. In other words, the surprise scores need not be used as features to train a model, but the surprise scores can still be used to evaluate the quality of the control systems and models of the ATV. For example, when deciding between two potential model implementations of a planning subsystem, the training subsystem can select the model that resulted in a lower number or distribution of surprise scores over a logged or simulated evaluation training set.

As one example, the surprise scores can be used to identify the onset of stimuli in models of agent reaction time. For example, a sufficiently high surprise score can indicate an incident in which other agents, the ATV, or both, would be highly likely to react to an unexpected situation. The models of reaction time can then be used as a benchmark for evaluating ATV reactions or to more realistically model the reaction time behavior of other agents that are interacting with the ATV. Thus, the system can use the models of agent reaction time to generate more realistic simulation data.

As another example, surprise scores can be used as an input to identify traffic conflicts. For example, the training system can use the computed surprise scores to identify simulated or logged data that represent when vehicles had conflicting paths. This can be a valuable tool when parsing vast amounts of logged data in order to identify the most complicated driving situations that may merit further study and analysis. In some implementations, the system can identify traffic conflicts by combining the surprise scores with one or more collision proximity metrics, e.g., a computed time-to-collision metric.

Lastly, the training subsystem 114 can use the surprise scores to compute a measure of simulator realism. To do so, the system can compute surprise scores for simulated data to determine how closely the surprise scores match those computed from actual logged data. This technique provides an efficient and powerful method for identifying when simulated agents are overly reactive or not reactive enough.

FIG. 2 is a diagram of an example flowchart for computing a surprise score. The example process can be performed by a system having one or more computers in one or more locations, e.g., the training system 110 or the on-board system 130 illustrated in FIG. 1. For clarity, the example process will be described as being performed by a system of one or more computers, programmed in accordance with this specification.

The system generates one or more predicted trajectories of an agent at each time step (210). As mentioned above, the system can compute the predicted trajectories for an ATV itself or for other agents. The system can continually generate the predicted trajectories at each time step of a plurality of time steps on an ongoing basis. At each time step, the predicted trajectories can be based on a current state of the agent, a window of previous states before the current time step, or both.

The system can represent the predicted trajectories in a number of different ways. For example, the predicted trajectories can be jointly represented at each time step by one or more values of one or more state variables or as a probability distribution over states that associates different measures of likelihood to each of the different trajectories. In some implementations, each probability distribution computed for a plurality of predicted trajectories is represented using a mixture model having component distributions for each of the predicted trajectories. Using a mixture model allows the system to use a smoothed notion of positional uncertainty or uncertainty regarding any other state variable, such as speed or acceleration.

The system computes values of one or more state variables of the agent at a current time step (220). The current state of the agent can be represented using one or more state variables. For example, the system can use one or more of position, speed, looming, and heading angle, to name just a few examples.

In some implementations, the system maintains separate lateral and longitudinal components for one or more of the state variables. For example, the system can represent lateral speed with one state variable and longitudinal speed with another state variable. Thus, a sharp lateral movement might result in a high lateral surprise score, while a similar magnitude of longitudinal movement might not, due to, e.g., the vehicle applying normal pressure to the brakes.

The system obtains first data representing one or more previously predicted states of the agent along one or more predicted trajectories at a prior time step (230). In this context, a predicted state represents a point along a predicted trajectory. In some implementations, a predicted trajectory itself is represented as a discrete series of predicted states rather than as continuous data structure or function. The system can thus select a respective point on each of the one or more predicted trajectories during a particular time step to obtain the one or more previously predicted states.

The system obtains second data representing one or more states of the agent for a subsequent time step (240). For example, the subsequent time step can be a current time step, in which case the state of the agent can simply be defined or based on the values of the one or more state variables. For example, if the agent state is defined by a vector having a position and a velocity, the current state can be defined by the values for the current position and current velocity of the agent.

The subsequent time step can also be a future time step, in which case the system can generate one or more predicted states of the agent based on the current state variables. For example, at a current time step, the state of the agent may not deviate significantly from a previously predicted trajectory.

However, the value of the state variables can indicate the detection of an unexpected obstacle or a corresponding rapid deceleration that is in progress. Therefore, when the system uses the current state variables to predict trajectories in the future, the predicted states along those future trajectories will differ significantly from what was predicted in the prior time step. Therefore, while the current position of the vehicle may not elicit a large surprise score, the current state variables and corresponding predicted trajectories may elicit a large surprise score in a future time step.

The system computes a surprise score based on a measure of the difference between the first data and the second data (250). The surprise score is thus a metric that represents how significantly the current or future state of the agent differs from what was previously predicted to occur.

Within this basic framework of backward-looking surprise, many different implementations and variations can be used for different situations and systems.

First, both the first data and the second data can be states or distributions over states. For example, when the first data and the second data are both states, the system can compute the surprise score as a difference between the states, which can be, e.g., a Euclidean distance.

The first data and the second data can also both be probability distributions. For example, the first data can represent a prior probability distribution over states, and the second data can represent a posterior probability distribution over states at the subsequent time step. The system can then compute a measure of the difference between the distributions, e.g., by computing the KL divergence of the distributions.

The system can also compare a posterior state to a prior probability distribution. For example, the first data can represent a prior probability distribution and the second data can represent a posterior state. The system can then compute the surprise score using a log likelihood of the posterior state given the prior probability distribution.

In addition, the framework can be used to generate a surprise score using single trajectories or multipath trajectories that represent different possible trajectories having respective measures of likelihood. For example, the generative model can be configured to generate a single, most likely trajectory, or alternatively, multiple different trajectories.

When the generative model generates multiple trajectories, the system can still compute a single-trajectory surprise score by selecting or computing a representative trajectory. The system can for example select a most likely trajectory among the multiple trajectories based on which trajectory has the highest respective measure of likelihood. Or the system can compute a representative trajectory from the multiple trajectories. In some implementations, the system can compute a representative trajectory that is a weighted average trajectory, with each predicted state of the weighted average trajectory being computed by weighing the component predicted states by the likelihoods of their respective trajectories.

Multipath trajectories can also be represented using statistical distributions. Using distributions rather than points provides some smoothing and allows the system to more robustly account for uncommon situations that are nevertheless possible. For example, each predicted state on each predicted trajectory at each time step can be represented using a location-based probability distribution that assigns a measure of likelihood to each of the multiple possible locations. In some implementations, the system can represent the predicted states on the multiple predicted trajectories for a single time step using a mixture model, e.g., a multivariate or a marginal Gaussian mixture model, in which each different trajectory is a component distribution of the mixture model.

The component distributions also allow the system to introduce time-based uncertainty into the computation. For example, each predicted state can be represented by a two-dimensional probability distribution, e.g., a Gaussian distribution, to reflect time-based uncertainty and state-based uncertainty.

The distributions can also be used to compute more sophisticated scoring functions that take into consideration low-likelihood trajectories that nevertheless commonly occur. For example, the system can treat the predictions from the previous time step as a prior distribution and use the current state of the agent to compute a posterior distribution.

The surprise score can then be computed as a measure of how much the posterior distribution deviates from the prior distribution. The deviation between the distributions can be computed in a number of different ways. For example, the system can compute an f-divergence, a KL divergence, in addition to a Hellinger distance or a Jensen-Shannon divergence.

As mentioned above, the system can keep separate the lateral and longitudinal components of any actual or predicted state. The system can then compute separate surprise scores for lateral deviations and longitudinal deviations.

Figure 3B:
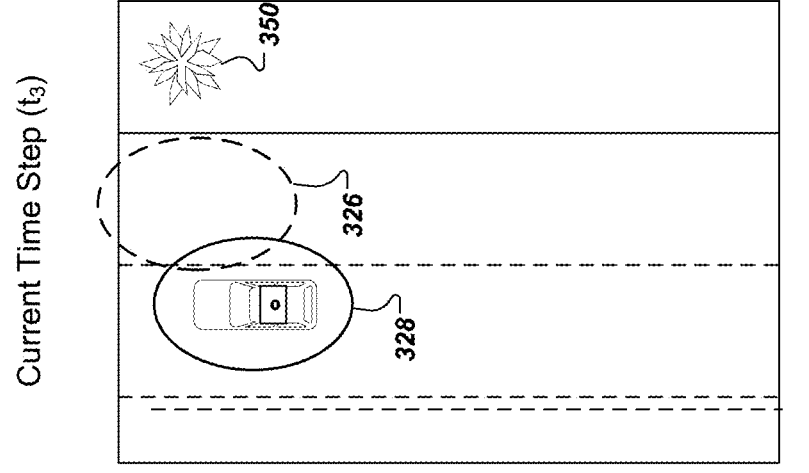
FIGS. 3A and 3B illustrate computing backward-looking surprise.
Figure 3A:
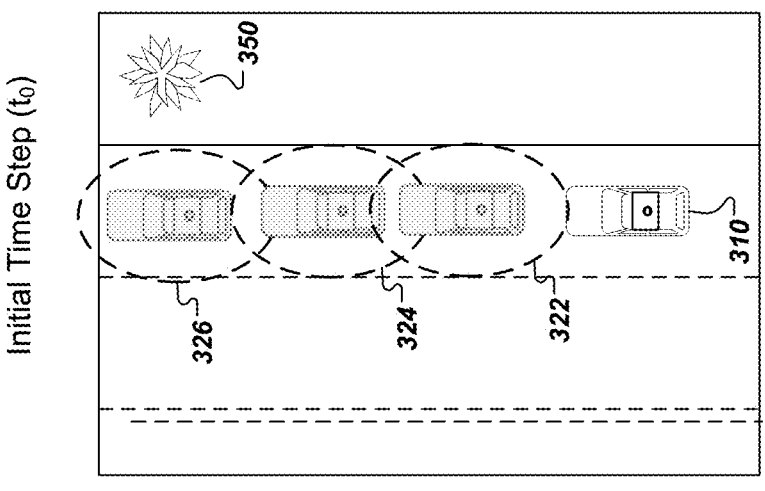

FIGS. 3A and 3B illustrate computing backward-looking surprise. As shown in FIG. 3A, in an initial time step t0, a vehicle 310 is at a first location. In time step to, a generative model generates a predicted trajectory having multiple predicted states 322, 324, and 326. The predicted states can be represented by estimated states represented by a two-dimensional probability distribution represented by dashed ellipses. In this example, the predicted state 326 predicts the vehicle to remain in the right-hand lane and to reach a location that is alongside a tree 350.

As shown in FIG. 3B, at time step t3, the current state of the vehicle can also be computed as a probability distribution, for example, as a posterior probability distribution given the current values of one or more state variables. In this example, the surprise score can be computed using a measure of the difference between predicted states that are both within the current time step of t3. Thus, the system can compute a measure of divergence between a second probability distribution representing the current state 328 at time t3 and a first probability distribution representing the predicted state 326 at time to.

In this example, the longitudinal component of the current state 328 does not differ substantially from the longitudinal component of the predicted state 326 because the vehicle has reached a position along the road that is even with the tree 350. However, the lateral component of the current state 328 does differ significantly from the lateral component of the predicted state 326, which is reflective of the fact that the vehicle has unexpectedly changed lanes rather than remaining in the right-hand lane.

One of the advantages of computing backward-looking surprise is that parameter sweeping can be used to generate many, possibly thousands, of different surprise scores from a single inference pass of the generative model. Because performing inference passes on sophisticated machine learning models can be costly in time, decoupling the surprise calculation results in vastly improved speed, which is critical for real-time operation.

For example, the system can generate one or more predicted trajectories, and then, for a current state, compute an estimated two-dimensional grid of surprise scores, with one axis being how far back the initial state is considered to be and the other axis being a number of steps into the future from the current state.

Thus, in this example, at time step t3, the system can use the following time steps as initial states: t0, t1, t2, and t3. The system can then use the values of the state variables to compute surprise assessments for these estimated current and estimated future states: t3, t4, t5, and t6.

This process would thus yield 16 different surprise scores using a single pair of runs of the generative model, that is, one to generate the prior distribution, and another to generate the posterior distribution.

Figure 4:
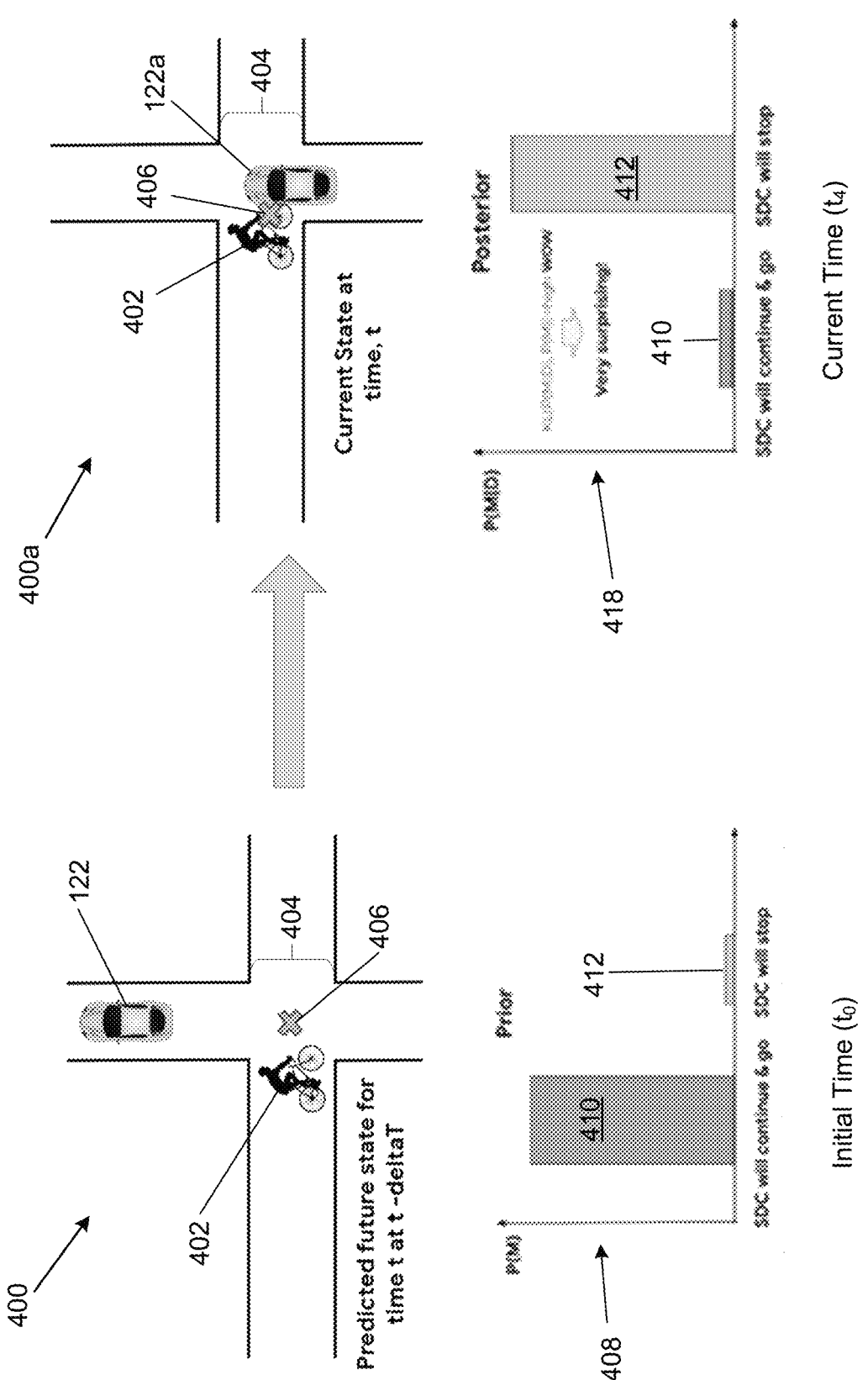
FIG. 4 illustrates modeling imposed surprise.

FIG. 4 illustrates modeling imposed surprise. In this example, the ATV system measures the surprise of a cyclist imposed by actions of the ATV. The scenario on the left of FIG. 4, and the accompanying binomial probability distribution 408, represents a scenario that is predicted by the generative model at time to. In this case, the generative model has predicted a trajectory of the ATV that is expected by the cyclist, which represents that at time t4, the ATV is expected to continue through the intersection 404 without stopping.

However, at time t4, based on the current values of the ATV state variables that indicate that the ATV is indeed slowing or stopping in the intersection 404, the binomial probability distribution 418 changes significantly. Based on a measure of the difference between the distribution 418 and the distribution 408, the ATV system can determine that the cyclist would experience significant imposed surprise.

If for example, t4 is in the future, the ATV can for example adjust the driving plan in a way that is expected to mitigate the surprise imposed on other agents such as the cyclist 302.

Figure 5:
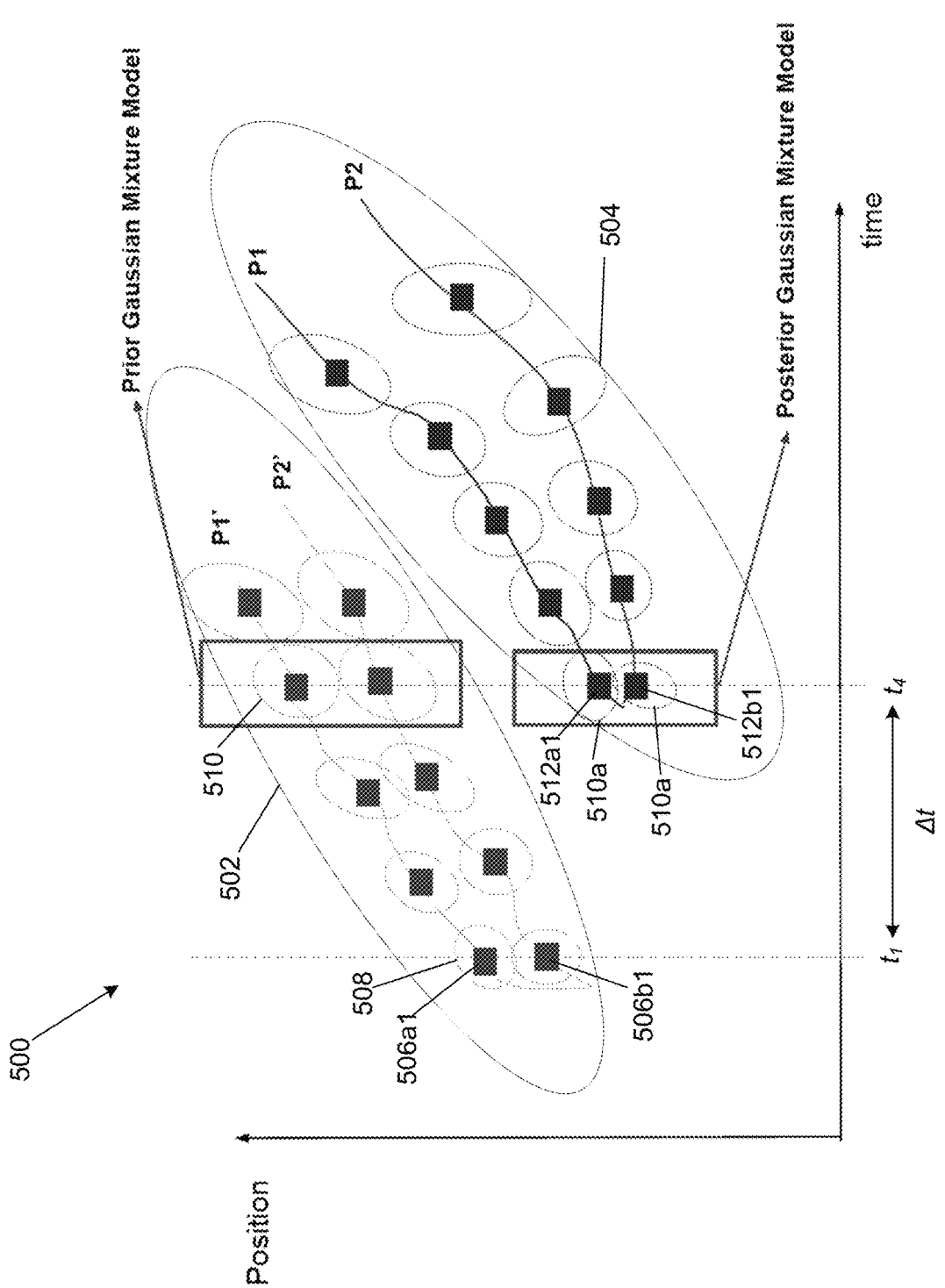
FIG. 5 illustrates using multipath trajectories represented as mixture models.

FIG. 5 illustrates using multipath trajectories represented as Gaussian mixture models. The chart 500 of FIG. 5 displays a plot of predicted position of an ATV versus time. The first vertical axis represents a position of the vehicle, while the second horizontal axis represents time.

A first pair 502 of trajectories represent two predicted or expected trajectories of a vehicle generated at a first initial time t1, where t1 occurs at a time $\Delta t$ prior to the current time t4. The first trajectory P1' in the first pair 502 of trajectories corresponds to a first predicted trajectory that the vehicle can take. The second trajectory P2' in the first pair 502 of trajectories corresponds to a second predicted trajectory that the vehicle can take.

Each trajectory in a pair of trajectories shows two alternative trajectories that the vehicle can take. The generative model can associate each trajectory with a corresponding likelihood and, at each time step, can represent the predicted states using a mixture model in which each of the predicted states is a separate component distribution.

At a time $\Delta t$ after the trajectories are generated, corresponding to time t4, the sensor subsystem 132 determines the updated actual state of the vehicle 122*a*. The updated actual state can be used to update the current estimated state, as well as to update the posterior distribution of the current estimated state. The updated actual state of the vehicle 122*a* can include positional data and corresponds to time step t4, such that the actual position can be used to generate a new pair 404 of predicted trajectories P1 and P2. Using the actual positional data as input, the prior probability distributions 410, corresponding to the expected states on trajectories P1' and P2', can be updated to generate a posterior probability distribution 510*a*. The posterior probability distribution 510*a* represents the updated prior probability distribution that resulted from adding one more data sample, the data sample being the actual state data 512*a*1, 512*b*1, including positional information that was collected by the sensor subsystem 132.

The system can then compute a surprise score as a measure of the divergence between a first mixture model representing the two prior estimated states at t4 and a second mixture model representing the two current estimated states at time step t4. In order to improve the stability and robustness of the surprise scores, the system can use a generative model that always generates the same number of predicted trajectories at each time step.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

In addition to the embodiments described above, the following embodiments are also innovative:

Embodiment 1 is a method comprising:

continually generating, at each time step of a plurality of time steps, data representing one or more predicted trajectories of an agent based on current state of the agent at a time step when the predicted trajectories are generated;

obtaining one or more values of one or more respective state variables;

obtaining first data representing one or more previously predicted states of the agent along the one or more predicted trajectories of the agent at the first time step, wherein the one or more previously predicted states were generated based on a prior state of the agent at a prior time step that occurred before the current time step;

obtaining, based on the one or more state variables, second data representing one or more states of the agent at a subsequent time step; and computing a surprise score including computing a measure of the difference between the first data computed for the one or more predicted trajectories for the prior time step and the second data computed for the one or more predicted states for the subsequent time step.

Embodiment 2 is the method of embodiment 1, wherein generating the one or more predicted trajectories is based on a window of one or more previous states before the time step of the current state.

Embodiment 3 is the method of any one of embodiments 1-2, wherein computing the surprise score comprises computing a measure of a difference between a predicted state of the agent and an actual state of the agent, wherein the first data represents the predicted state and wherein the second data represents the actual state.

Embodiment 4 is the method of any one of embodiments 1-3, wherein computing the surprise score comprises computing a measure of a difference between a posterior probability distribution and a prior probability distribution over states, wherein the first data represents the prior probability distribution over states and wherein the second data represents the posterior probability distribution over states.

Embodiment 5 is the method of any one of embodiments 1-4, wherein computing the surprise score comprises computing a log likelihood of a posterior state based on a prior probability distribution, wherein the first data represents the prior probability distribution and wherein the second state represents the posterior state.

Embodiment 6 is the method of any one of embodiments 1-5, wherein generating the data representing the one or more predicted trajectories comprises:

generating a plurality of predicted trajectories; and generating a representative trajectory from the plurality of predicted trajectories.

Embodiment 7 is the method of embodiment 6, wherein generating the representative trajectory from the plurality of predicted trajectories comprises computing a weighted average trajectory using a likelihood associated with each of the plurality of predicted trajectories.

Embodiment 8 is the method of embodiment 6, wherein generating the representative trajectory from the plurality of predicted trajectories comprises selecting a trajectory having a maximum likelihood.

Embodiment 9 is the method of any one of embodiments 1-8, wherein generating the data representing the one or more predicted trajectories comprises jointly representing a plurality of trajectories at each time step using a probability distribution.

Embodiment 10 is the method of embodiment 9, wherein each probability distribution computed for a plurality of predicted trajectories is a mixture model having component distributions for each of the predicted trajectories.

Embodiment 11 is the method of embodiment 10, wherein the mixture model represents a Gaussian distribution for each of the estimated state variables for each predicted state within a time step.

Embodiment 12 is the method of embodiment 9, wherein computing the measure of the difference between the first data and the second data comprises computing a measure of divergence between the second probability distribution and the first probability distribution.

Embodiment 13 is the method of embodiment 9, wherein the first probability distribution is a prior probability distribution and the second probability distribution is a posterior probability distribution based on the current state of the agent.

Embodiment 14 is the method of any one of embodiments 1-13, wherein computing the second data comprises computing a predicted state of the agent in a future time step along a plurality of predicted trajectories based on the current state of the agent.

Embodiment 15 is the method of any one of embodiments 1-14, wherein the method is performed by a computer-system on-board an autonomous or a semi-autonomous vehicle.

Embodiment 16 is the method of embodiment 15, wherein the surprise score is computed for another agent.

Embodiment 17 is the method of embodiment 15, wherein the predicted trajectories represent trajectories from the perspective of another agent, and wherein the surprise score is computed for the autonomous or semi-autonomous vehicle.

Embodiment 18 is the method of any one of embodiments 1-17, wherein the state variables comprise separate lateral and longitudinal components, and wherein computing the surprise score comprises computing separate lateral and longitudinal scores.

Embodiment 19 is the method of any one of embodiments 1-18, further comprising performing a parameter sweeping process to generate multiple surprise scores using only a single inference pass of the generative model, wherein a first parameter of the parameter sweeping process is which time step is used as the prior time step, and wherein a second parameter of the parameter sweeping process is a number of steps to predict into the future.

Embodiment 20 is the method of any one of embodiments 1-19, wherein the method is performed by a computer-system in an offline status in a location different from an autonomous or a semi-autonomous vehicle.

Embodiment 21 is the method of embodiment 20, and wherein the surprise score is computed for another agent.

Embodiment 22 is the method of embodiment 20, wherein the predicted estimated trajectories represent trajectories from the perspective of another agent, and wherein the surprise score is computed for the autonomous or semi-autonomous vehicle.

Embodiment 23 is a system comprising: one or more computers and one or more storage devices storing instructions that are operable, when executed by the one or more computers, to cause the one or more computers to perform the method of any one of embodiments 1 to 22.

Embodiment 24 is a computer storage medium encoded with a computer program, the program comprising instructions that are operable, when executed by data processing apparatus, to cause the data processing apparatus to perform the method of any one of embodiments 1 to 22.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

The invention claimed is:

1. A method comprising:

obtaining first data comprising a prior probability distribution representing a plurality of previously predicted states of an agent along one or more predicted trajectories of the agent from a first time step, wherein the plurality of previously predicted states were generated based on a prior state of the agent at a prior time step that occurred before a current time step;

obtaining second data comprising a posterior state representing one or more states of the agent at a subsequent time step; and computing a surprise score for the agent by comparing the posterior state to the prior probability distribution, wherein computing the surprise score for the agent comprises computing a likelihood of the posterior state based on the prior probability distribution.

2. The method of claim 1, wherein computing the surprise score for the agent comprises computing a measure of a difference between a predicted state of the agent and an actual state of the agent, wherein the first data comprises the predicted state and wherein the second data comprises the actual state.

3. The method of claim 1, wherein computing the surprise score for the agent comprises computing a measure of a difference between a posterior probability distribution and the prior probability distribution over states, wherein the second data comprises the posterior probability distribution over states.

4. The method of claim 1, wherein computing the surprise score for the agent comprises computing a measure of a difference between a first mixture model representing the plurality of previously predicted states and a second mixture model representing the one or more states of the agent at the subsequent time step, wherein the first data comprises the first mixture model, the second data comprises the second mixture model.

5. The method of claim 1, wherein obtaining the second data comprises computing a predicted state of the agent at the subsequent time step along a plurality of predicted trajectories based on a current state of the agent.

6. The method of claim 1, further comprising performing a parameter sweeping process to generate multiple surprise scores using only a single inference pass of a generative model that generates predicted states of the agent, wherein a first parameter of the parameter sweeping process is which time step is used as the prior time step, and wherein a second parameter of the parameter sweeping process is a number of steps to predict into a future time step.

7. The method of claim 1, wherein the method is performed by a computer-system on-board an autonomous or a semi-autonomous vehicle.

8. The method of claim 1, wherein the method is performed by a computer-system in an offline status in a location different from an autonomous or a semi-autonomous vehicle.

9. A system comprising:
one or more computers and one or more storage devices storing instructions that are operable, when executed by the one or more computers, to cause the one or more computers to perform operations comprising:
obtaining first data comprising a prior probability distribution representing a plurality of previously predicted states of an agent along one or more predicted trajectories of the agent from a first time step, wherein the plurality of previously predicted states were generated based on a prior state of the agent at a prior time step that occurred before a current time step;
obtaining second data comprising a posterior state representing one or more states of the agent at a subsequent time step; and
computing a surprise score for the agent by comparing the posterior state to the prior probability distribution, wherein computing the surprise score for the agent comprises computing a likelihood of the posterior state based on the prior probability distribution.

10. The system of claim 9, wherein computing the surprise score for the agent comprises computing a measure of a difference between a predicted state of the agent and an actual state of the agent, wherein the first data comprises the predicted state and wherein the second data comprises the actual state.

11. The system of claim 9, wherein computing the surprise score for the agent comprises computing a measure of a difference between a posterior probability distribution and the prior probability distribution over states, wherein the second data comprises the posterior probability distribution over states.

12. The system of claim 9, wherein computing the surprise score for the agent comprises computing a measure of a difference between a first mixture model representing the plurality of previously predicted states and a second mixture model representing the one or more states of the agent at the subsequent time step, wherein the first data comprises the first mixture model, the second data comprises the second mixture model.

13. One or more non-transitory computer storage media encoded with computer program instructions that when executed by one or more computers cause the one or more computers to perform operations comprising:
obtaining first data comprising a prior probability distribution representing a plurality of previously predicted states of an agent along one or more predicted trajectories of the agent from a first time step, wherein the plurality of previously predicted states were generated based on a prior state of the agent at a prior time step that occurred before a current time step;
obtaining second data comprising a posterior state representing one or more states of the agent at a subsequent time step; and
computing a surprise score for the agent by comparing the posterior state to the prior probability distribution, wherein computing the surprise score for the agent comprises computing a likelihood of the posterior state based on the prior probability distribution.

14. The non-transitory computer storage media of claim 13, wherein computing the surprise score for the agent comprises computing a measure of a difference between a predicted state of the agent and an actual state of the agent, wherein the first data comprises the predicted state and wherein the second data comprises the actual state.

15. The non-transitory computer storage media of claim 13, wherein computing the surprise score for the agent comprises computing a measure of a difference between a posterior probability distribution and the prior probability distribution over states, wherein the second data comprises the posterior probability distribution over states.

16. The non-transitory computer storage media of claim 13, wherein computing the surprise score for the agent comprises computing a measure of a difference between a first mixture model representing the plurality of previously predicted states and a second mixture model representing the one or more states of the agent at the subsequent time step, wherein the first data comprises the first mixture model, the second data comprises the second mixture model.

17. The non-transitory computer storage media of claim 13, wherein obtaining the second data comprises computing a predicted state of the agent at the subsequent time step along a plurality of predicted trajectories based on a current state of the agent.

18. The non-transitory computer storage media of claim 13, wherein the operations further comprise:
performing a parameter sweeping process to generate multiple surprise scores using only a single inference pass of a generative model that generates predicted states of the agent, wherein a first parameter of the parameter sweeping process is which time step is used as the prior time step, and wherein a second parameter of the parameter sweeping process is a number of steps to predict into a future time step.

19. The non-transitory computer storage media of claim 13, wherein the operations are performed by a computer-system on-board an autonomous or a semi-autonomous vehicle.

20. The non-transitory computer storage media of claim 13, wherein the operations are performed by a computer-system in an offline status in a location different from an autonomous or a semi-autonomous vehicle.

* * * * *